United States Patent [19]
Nishida et al.

[11] Patent Number: 5,633,842
[45] Date of Patent: May 27, 1997

[54] DISK SELECTION CONTROL DEVICE FOR MULTIDISK PLAYER

[75] Inventors: Junichi Nishida; Fumio Endo; Akira Hayama; Toshiyuki Kimura; Hitoshi Sato; Kiyoshi Furukawa; Kenji Kaneko, all of Kawagoe, Japan

[73] Assignee: Pioneer Electronic Corporation, Tokyo, Japan

[21] Appl. No.: 431,396

[22] Filed: Apr. 28, 1995

Related U.S. Application Data

[63] Continuation of Ser. No. 26,072, Mar. 4, 1993, abandoned, which is a continuation of Ser. No. 653,266, Feb. 11, 1991, abandoned.

[30] Foreign Application Priority Data

May 8, 1990 [JP] Japan ..................... 2-119169

[51] Int. Cl.$^6$ ............................................. G11B 17/22
[52] U.S. Cl. ................................... 369/32; 369/34
[58] Field of Search ........................... 369/32, 30, 33, 369/34, 36, 27, 57, 56, 3; 360/13, 69, 15

[56] References Cited

U.S. PATENT DOCUMENTS

| | | | |
|---|---|---|---|
| 4,667,314 | 5/1987 | Iwashima | 369/34 |
| 4,787,073 | 11/1988 | Masaki | 369/34 |
| 4,792,934 | 12/1988 | Masaki | 369/36 |
| 4,817,075 | 3/1989 | Kikuchi et al. | 360/15 |
| 4,841,506 | 6/1989 | Kiyoura et al. | 369/41 |
| 4,855,979 | 8/1989 | Kimura et al. | 369/33 |
| 4,893,293 | 1/1990 | Endo et al. | 369/33 |
| 4,899,331 | 2/1990 | Masaki et al. | 369/33 |
| 5,051,973 | 9/1991 | Shiba et al. | 369/30 |
| 5,157,646 | 10/1992 | Amemiya et al. | 369/36 |

FOREIGN PATENT DOCUMENTS

| | | |
|---|---|---|
| 0265167 | 4/1988 | European Pat. Off. . |
| 0383530 | 8/1990 | European Pat. Off. . |
| 62-14369 | 1/1987 | Japan . |

OTHER PUBLICATIONS

Patent Abstracts of Japan, vol. 14, No. 4, Jan. 9, 1990 & JP-A-1,256,090, Oct. 12, 1989 (Partial Translation).

*Primary Examiner*—Thang V. Tran
*Attorney, Agent, or Firm*—Keck, Mahin & Cate

[57] ABSTRACT

A disk selection control device for a multidisk player, in which disk content identifying information and TOC information of the disks are preliminarily stored correspondingly with each other, and the disk content identifying information and disk holding position information of the disks are stored correspondingly with each other according to the TOC information when it is read-out. By inputting the disk content identifying information, the disk holding position information corresponding to the input disk content identifying information can be obtained from the above correspondency therebetween to thereby select a desired disk.

6 Claims, 3 Drawing Sheets

DISK SELECTION CONTROL DEVICE FOR MULTIDISK PLAYER

This is a continuation of application Ser. No. 08/026,072 filed on Mar. 4, 1993, now abandoned, which is a continuation of application Ser. No. 07/653,266 filed on Feb. 11, 1991, now abandoned, the text of which is hereby incorporated by reference.

BACKGROUND OF THE INVENTION

1. Field of the Invention

The present invention relates to a disk selection control device for a multidisk player, and more particularly to a disk selection control device for a multidisk player capable of housing a plurality of disks inclusive of a memory disk and selectively playing any one of the plurality of disks.

2. Description of Background Information

In a multidisk player capable of housing a plurality of digital audio disks (which will be hereinafter referred simply to as audio disks) called CDs (compact disks) and selectively playing any one of the plurality of disks, a user ordinarily designates a disk number indicative of the holding position of a disk, so that the disk in the holding position corresponding to the designated disk number is selected to play the selected disk. Accordingly, it is necessary for the user to preliminarily remember which one of the disks is held in a given position, that is, the association between the disk and the disk holding position. However, it is generally not easy for the user to remember the above association and the contents of all the housed disks in relation to the disk numbers.

In recent years, there has been developed a so-called navigation system in which a display is mounted as one of an on-vehicle component. In such a navigation system, map data is stored in a CD-ROM (digital information read-only memory (ROM)) used as a storage medium. The map data is read from the CD-ROM as required, and it is supplied as a display information signal to the display, thereby displaying a map corresponding to the map data on the display and enabling a user to recognize the present position of a vehicle. A CD-ROM (which will be hereinafter referred to as a memory disk) which is used as the storage medium for storing the map data has the same signal format as that of CD. Therefore, data from the memory disk can be reproduced simply by adding a CD-ROM decoder to a conventional disk player. Accordingly, by loading the memory disks in addition to the audio disks in the multidisk player, music can be played and maps can be displayed by means of a single player.

However, as mentioned above, it is difficult for the user to remember the contents of all the housed disks in relation to the holding positions of the disks. Accordingly, if audio disks and the memory disks are housed in a mixed manner in the multidisk player, upon designating a disk number indicative of the disk holding position, the user may erroneously select a memory disk when he wishes to listen to a music, or conversely, the user may erroneously select an audio disk when he wishes to display a map.

OBJECT AND SUMMARY OF THE INVENTION

It is accordingly an object of the present invention to provide a disk selection control device for a multidisk player which eliminates the necessity for the user to remember the contents of all the disks housed in the magazine in relation to the holding positions of the disks, thereby to automatically select a desired one of the disks.

According to the present invention, there is provided a disk selection control device for a multidisk player capable of housing a plurality of disks each having a lead-in area where indexing information is recorded and selecting and playing any one of said plurality of disks according to disk designating information, said disk selection control device comprising first storing means for storing disk content identifying information for identification of contents in said plurality of disks and said indexing information of said plurality of disks correspondingly with each other; control means for playing said plurality of disks in the order of the holding position thereof in response to a command and reading said indexing information of said plurality of disks; second storing means for storing said disk content identifying information obtained from said first storing means and disk holding position information indicative of said holding position of said plurality of disks correspondingly with each other according to said indexing information read by said control means; inputting means for inputting said disk content identifying information for selecting one of said plurality of disks; and means for obtaining said disk holding position information corresponding to said input disk content identifying information from said second storing means to employ said corresponding disk holding position information as said disk designating information.

In the disk selection control device for the multidisk player of the present invention, the disk content identifying information for identification of the contents in the plurality of disks and the indexing information of the plurality of disks are preliminarily stored in the first storing means correspondingly with each other. In response to a command, the plurality of disks are played in the order of the holding position of the disks, and the indexing information of the plurality of disks is read. According to the read-out indexing information, the disk content identifying information to be obtained from the first storing means and the disk holding position information indicative of the holding positions of the plurality of disks are stored into the second storing means correspondingly with each other. In selecting one of the plurality of disks, when the disk content identifying information is input, the disk holding position information corresponding to the input disk content identifying information is obtained from the second storing means, and this disk holding position information is employed as the disk designating information for selection of the desired disk.

DETAILED DESCRIPTION OF THE PREFERRED EMBODIMENTS

Figure 1:
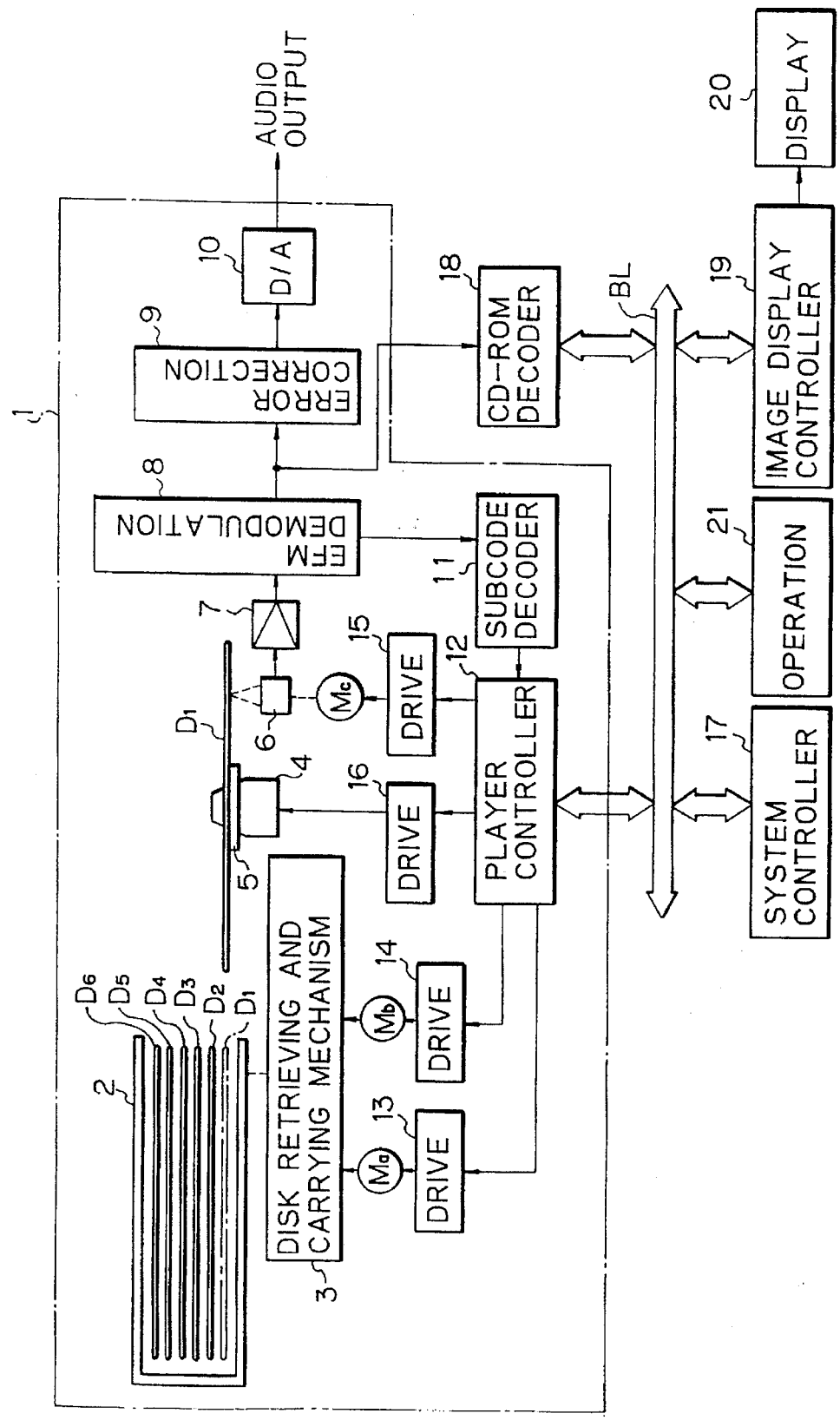
FIG. 1 is block diagram showing a preferred embodiment of the present invention.

There will now be described a preferred embodiment of the present invention with reference to the drawings. Referring to FIG. 1, a multidisk player 1 is provided with a magazine 2 for retaining a plurality of disks (CD), and is capable of carrying out continuous play for continuously playing all tunes recorded on the plurality of disks, program play for playing previously selected tunes in a previously designated order, or random play for playing arbitrarily selected tunes according to random numbers or the like. Further, this player 1 is also capable of reproducing information on a memory disk such as a CD-ROM, and the magazine 2 can hold both the ordinary audio disks and the memory disks in a mixed manner.

In this preferred embodiment, a magazine 2 can hold the plurality of disks, e.g., six disks $D_1$ to $D_6$ and arrange the disks in order at a given pitch. The magazine 2 is provided with six trays (not shown) for carrying the respective disks $D_1$ to $D_6$ so that the trays can be projected from or withdrawn into a body of the magazine 2. The magazine 2 is detachably mounted to a predetermined mounting portion of a body of the player 1. One of the six disks $D_1$ to $D_6$ held on the respective trays in the magazine 2 is retrieved and carried onto a turntable 5 fixed to a rotating shaft of a spindle motor 4, by a disk retrieval and carrying mechanism 3. Thereafter the disk is clamped to the turntable 5.

The disk retrieving and carrying mechanism 3 includes a push member (not shown) for projecting one of the trays in the magazine 2 and moving the disk D on the projected tray onto the turntable 5, a clamping mechanism (not shown) for clamping the disk D when the disk D is moved onto the turntable 5 by the push member, a moving plate (not shown) for changing a position of the push member relative to the magazine 2 in a direction of arrangement of the held disks, and sensor for sensing a position of the moving plate, operation of the clamping mechanism, etc. In the disk retrieving and carrying mechanism 3, the moving plate is driven by a motor Ma, and the push member is driven by a motor Mb. In operation, the moving plate is moved by the motor Ma to position the push member in opposition to the tray corresponding to a desired disk. Then, the push member is driven by the motor Mb to push the selected tray out, thus selecting the desired disk. The construction of the magazine 2 and the disk retrieving and carrying mechanism 3 is described in more detail in Japanese Patent Application Laid-open No. 62-14369.

The disk D loaded on the turntable 5 is rotated by the spindle motor 4. Recorded information on the disk D is read by an optical pickup 6. The pickup 6 is mounted on a slider (not shown) adapted to be driven by a slider motor Mc and moved in a radial direction of the disk D. When a CD format signal is read by the pickup 6, the output signal from the pickup 6 is an EFM (Eight to Fourteen Modulation) signal. The read EFM signal is fed through an RF amplifier 7, and is then EFM-demodulated by an EFM demodulating circuit 8. A part of a demodulated output from the EFM demodulating circuit 8 is processed for error correction by an error correcting circuit 9, and is converted into an analog signal by a D/A converter 10. Then, the analog signal is output as a reproduced audio signal. On the other hand, a part of the demodulated output from the EFM demodulating circuit 8 is also supplied to a subcode decoder 11. The subcode decoder 11 serves to decode subcode information inserted per unit frame, which information includes the number of the music piece, index, time in the music piece and frame number. The subcode decode 11 also decodes the information inclusive of the absolute time in the disk and frame number. Data decoded from the subcode decoder 11 is supplied to a player controller 12.

In the lead-in area of the disk D, there is recorded index information called TOC (Table of Contents) information including, in a subcode Q signal, disk identifying information for identifying whether the disk D is an audio disk (CD) or a memory disk (CD-ROM). The content of the TOC information depends on the recorded content of the disk D. In the preferred embodiment, map data, for example, is stored in the memory disk. Assuming that the whole land of Japan is divided into four wide areas, a map data group corresponding to the map of one of the four wide areas and a plurality of map data groups corresponding to a plurality of maps corresponding to a plurality of divided areas obtained by dividing the wide area are stored in the single memory disk.

The player controller 12 includes a microcomputer having a processor. The processor of the player controller 12 serves to control the driving of the disk retrieving and carrying mechanism 3 through driving circuits 13 and 14 of the motors Ma and Mb, the driving of the pickup 6 through a slider driving circuit 15 of the slider motor Mc, and the driving of the spindle motor 4 through a spindle driving circuit 16. Further, the processor also serves to transfer the TOC information read from the lead-in area of the disk and decoded by the subcode decoder 11 to a bus line BL formed of an optical fiber, for example, in response to a request from a system controller 17 which will be hereinafter described in detail.

A part of the demodulated output from the EFM demodulating circuit 8 is also supplied to a CD-ROM decoder 18. The CD-ROM decoder 18 serves to decode the map data read from the memory disk (CD-ROM) and demodulated by the EFM demodulating circuit 8, and supply it through the bus line BL to an image display controller 19. The image display controller 19 serves to control a display 20 such as a liquid crystal display so as to display an image of a map or the like according to an image information signal including the map data supplied from the CD-ROM decoder 18.

The system controller 17 includes a microcomputer having a processor for controlling of the whole system. The player controller 12, the CD-ROM decoder 18 and the image display controller 19 are connected through the bus line BL to the system controller 17, so as to mutually exchange information. An operating unit 21 is also connected through the bus line BL to the system controller 17. According to key input or the like by a user, the operating unit 21 serves to designate a disk number, a map number and a play mode, and also generate a command for storing an association between disk content identifying information (map number) and a holding position (tray number) of each disk in the magazine 2.

The system controller 17 has an internal memory which preliminarily stores the disk content identifying information for identification of the record content of each disk and the TOC information (indexing information) of each disk correspondingly with each other. For example, if four memory disks are used to store respectively map data of the whole land of Japan by dividing the map data, the disk content identifying information represents map numbers of Map 1 (Hokkaido Area), Map 2 (Higashi Nippon Area), Map 3 (Nishi Nippon Area) and Map 4 (Shikoku-Kyushu Area).

There will now be described a processing operation to be executed by the processor of the system controller 17 in storing the association between the disk content identifying information and the holding position of each memory disk, with reference to a flowchart shown in FIG. 2. It is assumed that the following routine is called and executed whenever a storing command for storing the association is generated from the operating unit 21.

When the storing command is generated from the operating unit 21, the processor of the system controller 17 requests the player controller 12 to read the TOC information of all the disks retained in the magazine 2 (step S1). Thereafter, the processor waits for a reply that the reading of the TOC information of all the disks has been completed from the player controller 12 (step S2). If the processor receives the reply indicating the completion of to reading, then it requests the player controller 12 to transfer of all the TOC information (step S3).

In the above steps, according to the control operation of the processor thereof, the player controller 12 plays all the disks retained in the magazine 2 in the order of the holding positions (tray numbers) and reads the TOC information of all the disks. After the reading of the TOC information of all the disks is completed, the processor of the player controller 12 informs the system controller 17 of the completion of the reading. Then, in response to the request of transfer from the system controller 17, the processor of the player controller 12 transfers all the read TOC information to the system controller 17.

When all the TOC information is transferred to the system controller 17, the processor of the system controller 17 determines whether or not the disk held in the tray of a tray number n (n is an integer from 1 to 6) indicative of a disk holding position is a memory disk, starting from n=1 (step S4). The determination whether or not the disk is a memory disk is carried out according to the disk identifying information carried by the subcode Q signal of the TOC information. If it is determined that the disk held in the tray of the tray number 1 is a memory disk, the processor determines whether or not the TOC information of the disk of the tray number 1 coincides with the TOC information of the disk of a map number m (m is an integer from 1 to 4), on the basis of the association between the map number m and the TOC information of each memory disk preliminarily stored in the internal memory of the system controller 17 as mentioned previously (steps S5 to S7). If the TOC information of the disk of the tray number 1 coincides with the TOC information of the disk of the map number m, the processor stores the map number m into the internal memory corresponding to the tray number 1 (step S8). Then, the program proceeds to step S9 and returns to step 4 through step S10, so as to execute the operations of the above steps S4 to S8 for all the tray numbers.

According to the above processing operation, if a memory disk is retained in the magazine 2, the tray number n indicative of a holding position of the memory disk and the disk content identifying information for identification of a recorded content in the memory disk (e.g., the map number m indicating an area such as the Hokkaido area, since the map data is recorded in the memory disk in this example) are stored into the internal memory of the system controller 17 associated with each other. Accordingly, in displaying a desired one of the maps, when a user operates the operating unit 21 by key input or the like to designate the map number m indicating the desired map, the tray number n corresponding to the map number m can be known, and the memory disk in the holding position of the tray number n can be selected automatically.

Figure 3:
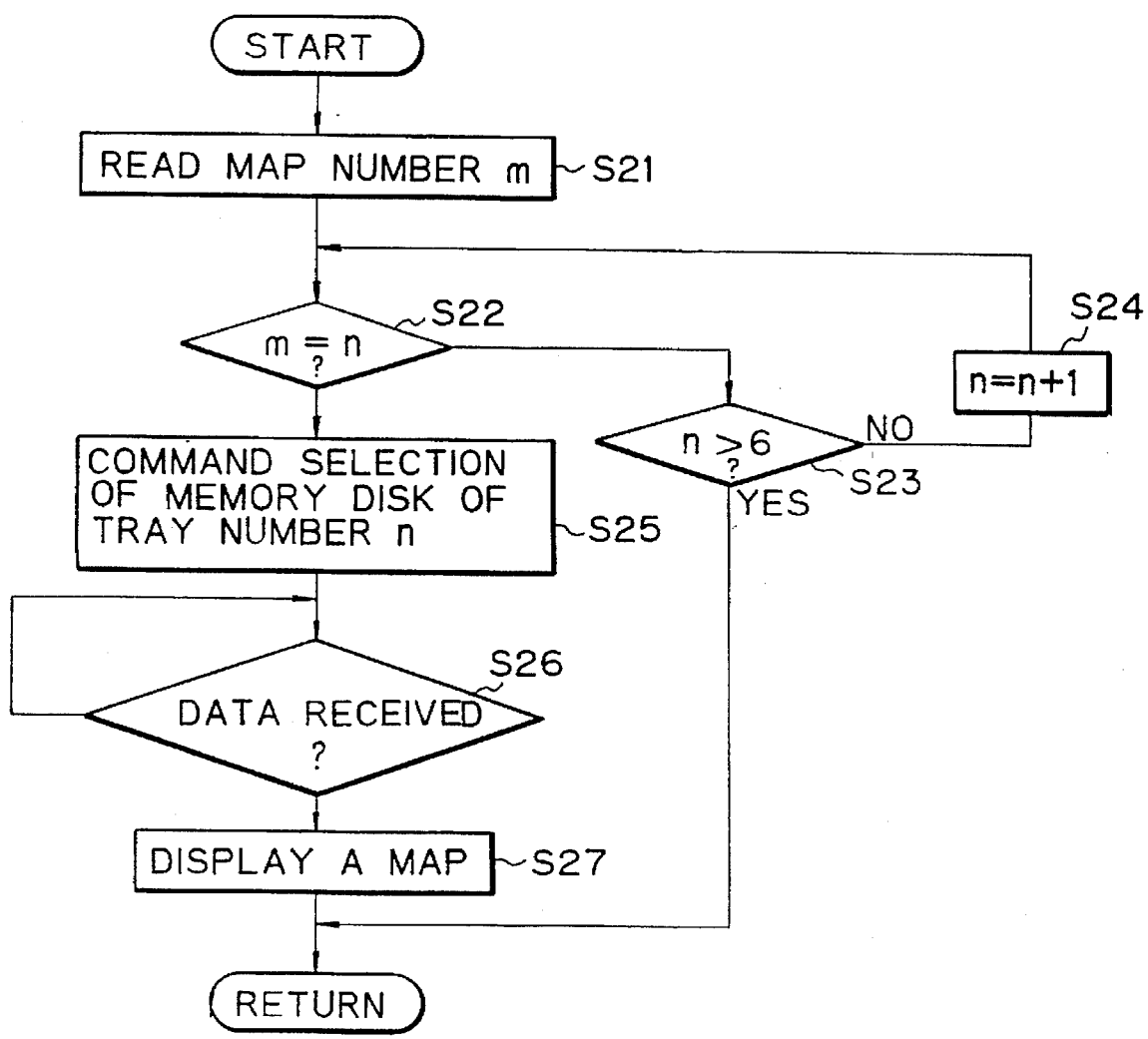
FIG. 3 is a flowchart showing a processing operation to be executed by the processor of the system controller in selecting a desired memory disk by designating a map number corresponding thereto.

Next, a processing operation executed by the processor of the system controller 17 in selecting the memory disk corresponding to the map number m by designating the map number m will be explained with reference to a flowchart shown in FIG. 3. It is assumed that the following routine is called and executed whenever a disk selecting command is generated from the operating unit 21 by designating the map number m.

Figure 2:
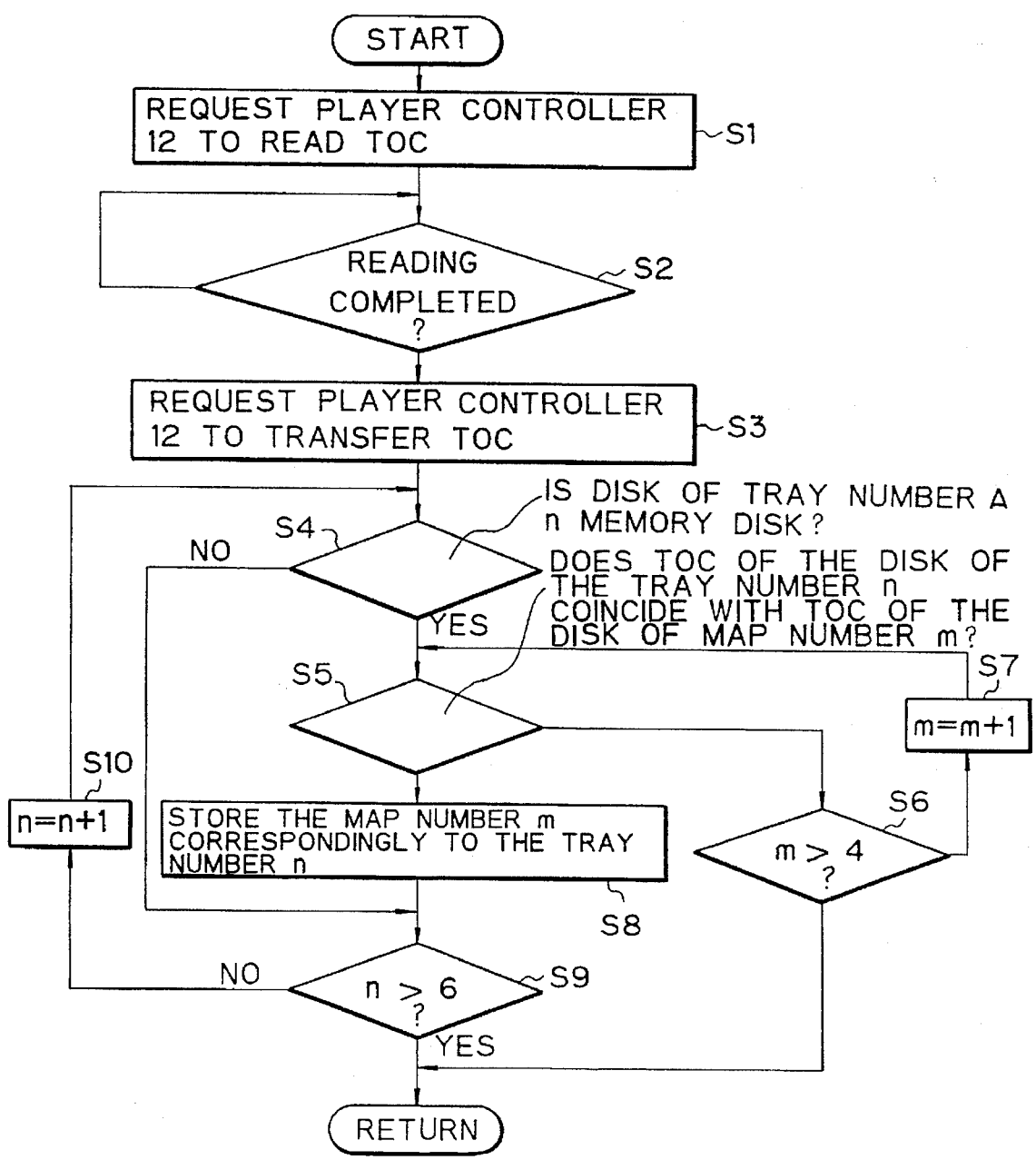
FIG. 2 is a flowchart showing a processing operation executed by a processor of a system controller in storing the association between the disk content identifying information and the holding position of each memory disk.

When the disk selecting command is generated, the processor of the system controller 17 retrieves the designated map number (step S21), and then determines the tray number n corresponding to the retrieved map number among the tray number 1 through 6, on the basis of the association between the map number m and the tray number n previously stored at step S8 shown in FIG. 2 (steps S22 to S24). When the corresponding tray number n is determined, a select command for selecting the memory disk of the corresponding tray number n together with the corresponding tray number n is supplied to the player controller 12 (step S25). Thereafter, the processor of the system controller 17 waits for output of a map data from the CD-ROM decoder 18 to be obtained by the selection and the subsequent play of the memory disk corresponding to the designated map number m (step S26).

In the above steps, by the control operation of the processor of the player controller 12 in the multidisk player 1, the memory disk in the holding position of the tray number n designated by the system controller 17 is selected and subsequently played. Then, data read from the memory disk decoded by the CD-ROM decoder 18, and is output to the bus line BL.

When the processor of the system controller 17 detects the output of the map data to the bus line BL, it operates the image display controller 19 to display a map on the display 20 according to the map data (step S27).

Thus, in the multidisk player 1 of the preferred embodiment as mentioned above, even when a memory disk and an audio disk are retained in the magazine 2 in a mixed manner, a tray number n of the memory disk and a map number m identifying a recorded output in the memory disk are stored while the association between them is maintained. Accordingly, in displaying a desired map, when a user operates the operating unit 21 by key input or the like to designate a map number m of the desired map, the memory disk corresponding to the designated map number m is automatically selected and played. That is, the user is not required to pay attention in selecting the holding position for each memory disk. Furthermore, the user need not remember the association between the recorded content in the memory disk and the holding position thereof, but is merely required to designate the map number m, to select a desired memory disk.

As described above, in the disk selection control device for the multidisk player of the present invention, association between the disk content identifying information for identification of the contents in the plurality of disks and the indexing information of the plurality of disks are preliminarily stored. In response to a command, the plurality of disks are played in the order of the holding positions of the disks, and the indexing information of the plurality of disks are read. According to the read-out indexing information, the disk content identifying information obtained from the above association and the disk holding position information indicative of the holding positions of the plurality of disks are stored into the memory corresponding with each other. In selecting one of the plurality of disks, when the disk content identifying information is input, the disk holding position information corresponding to the input disk content identifying information is obtained from the memory, and this disk holding position information is employed for selection of the desired disk. Accordingly, the desired disk can be automatically selected without need for the user to remember the contents in all the disks retained in the magazine and the holding positions of those disks.

What is claimed is:

1. A method for selecting playback of one of a plurality of disks stored in a multidisk player, the method comprising the steps of:

reading from a recorded information lead-in area of each of said plurality of disks loaded in said multidisk player indexing information, said indexing information including identification of a disk type;

determining a disk holding position of each of said plurality of disks in said multidisk player and generating for each respective one of said plurality of disks a disk holding position information indicative of the holding position of each respective one of said plurality of disks;

storing the disk holding position information and the indexing information associated each other for said respective one of said plurality of disks at an internal memory of a system controller;

determining each of the plurality of disks as either a memory disk or a music disk based on the identification of a disk type in association with the disk holding position information;

storing disk content identifying information for identifying the contents of each of said plurality of disks at the internal memory of the system controller if each of said plurality of disks is determined as a memory disk in the above determining step, said disk content identifying information being stored in association with the disk holding position information based on a correlation between the disk content identifying information and the indexing information for the corresponding disks, respectively;

receiving, in response to user input, a disk selection command including a selected disk content information for selecting a particular one of said plurality of disks having a content corresponding to said selected disk content information;

determining a particular one of said stored disk content identifying information corresponding to said selected disk content information; and determining the disk holding position information associated with said particular one of said stored disk content identifying information for selecting for playback the disk held at the corresponding disk holding position.

2. The method of claim 1, wherein at least one of said plurality of disks is a memory disk on which map data is stored, and the disk content identifying information comprises a map number indicative of content of a map stored on the memory disk.

3. The method of claim 2, wherein said plurality of disks comprises a plurality of music disks storing music and a pluralites of memory disks each storing map data, said plurality of music disks and memory disks being intermixed with each other in said multidisk player.

4. A disk selection control device operating in a multidisk player, wherein said multidisk player houses a plurality of disks in a magazine, each of said plurality of disks having a lead-in area where indexing information is recorded, said indexing information including identification of a disk type, said device for selectively playing any one of said disks, the disk selection control device comprising:

retrieving means for retrieving each of said disks from a holding position in said magazine;

reading/storing means for reading and storing the indexing information of each of said plurality of disks;

disk position means for determining and storing disk holding position information indicative of said holding position of each of said disks in association with disk content identifying information and indexing information for the corresponding same one of said disks;

means for determining each of the plurality of disks as either a memory disk or a music disk based on the identification of a disk type in association with the disk holding position information;

storing means for storing the disk content identifying information indicative of disk content of the memory disk determined by said means for determining;

returning means for returning said disks to said holding position in said magazine;

means for receiving, in response to use input, a disk content selection command indicative of the content of a particular one of said disks, said receiving means selecting said particular one of said disks having content corresponding to said disk content selection command; and means for determining which disk content identifying information of a particular disk corresponds to said disk content selection command, and for determining which particular disk holding position information is associated with said disk content identifying information of said particular one of disks, thereby selecting for playback the particular one of disks held at a disk holding position corresponding to said particular disk holding position information.

5. The disk selection control device as defined in claim 4, wherein at least one of said plurality of disks is a memory disk in which a map data is stored, and said particular stored disk content identifying information comprises the map number indicative of a content of a map stored on said memory disk, and said disk content selection command comprises said map number.

6. A multidisk player for housing a plurality of disks of varying format in a holding position wherein each of said disks contains indexing information, said indexing information including identification of a disk type, said player comprising:

player means for playing a designated disk in response to disk designating information;

first storage means for reading from a recorded information lead-in area of the disks and for storing said indexing information and disk content identifying information;

first means for determining a holding position of each of said plurality of disks;

second storage means for storing said indexing information and a holding position information representing a holding position in a corresponding relationship;

second means for determining each of the plurality of disks as either a memory disk or a music disk based on the identification of a disk type in association with the holding position information;

third storage means for storing disk content identifying information indicative of disk content of the memory disk determined by said second means for determining;

means for inputting the disk content identifying information; and means for selecting the designated disk in response to the disk designating information based upon a particular holding position information that corresponds to said disk content identifying information.

* * * * *